United States Patent
Becker et al.

(10) Patent No.: US 10,157,321 B2
(45) Date of Patent: Dec. 18, 2018

(54) VEHICLE EVENT DETECTION AND CLASSIFICATION USING CONTEXTUAL VEHICLE INFORMATION

(71) Applicant: GENERAL MOTORS LLC, Detroit, MI (US)

(72) Inventors: Tyson Becker, Royal Oak, MI (US); Gregory A. Ross, Beverly Hills, MI (US); Ryan Olejniczak, Clinton Township, MI (US); Esteban Camacho, Belleville, MI (US); Alexander X. Cermak, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/482,541

(22) Filed: Apr. 7, 2017

(65) Prior Publication Data

US 2018/0293446 A1    Oct. 11, 2018

(51) Int. Cl.

| | |
|---|---|
| *G06F 19/00* | (2018.01) |
| *G06K 9/00* | (2006.01) |
| *G08G 1/01* | (2006.01) |
| *G07C 5/00* | (2006.01) |
| *G09B 19/16* | (2006.01) |
| *B60W 40/02* | (2006.01) |
| *G07C 5/08* | (2006.01) |

(52) U.S. Cl.
CPC ......... *G06K 9/00791* (2013.01); *B60W 40/02* (2013.01); *G06K 9/00845* (2013.01); *G07C 5/008* (2013.01); *G07C 5/0808* (2013.01); *G08G 1/0104* (2013.01); *G09B 19/167* (2013.01); *G06K 2009/00738* (2013.01)

(58) Field of Classification Search
CPC combination set(s) only.
See application file for complete search history.

(56) References Cited

U.S. PATENT DOCUMENTS

| 2014/0139355 A1* | 5/2014 | Zarife | ..................... G08G 1/166 340/905 |
|---|---|---|---|
| 2014/0148972 A1* | 5/2014 | Basir | ..................... G07C 5/008 701/1 |

* cited by examiner

*Primary Examiner* — Adam M Alharbi
(74) *Attorney, Agent, or Firm* — David Willoughby; Reising Ethington P.C.

(57) ABSTRACT

A method and system for detecting vehicle events and classifying them based on contextual vehicle information. The method includes detecting a vehicle event using vehicle movement data, and then obtaining and analyzing contextual vehicle information associated with the vehicle event. The contextual vehicle information may be indicative of an external condition that led to the vehicle event, such as an object in the vehicle's path, that helps classify the vehicle event for purposes of insurance risk assessment. Another disclosed method involves comparing the vehicle movement data with the vehicle performance requirements for each of the plurality of insurance carrier plans, and notifying a vehicle operator when the vehicle data satisfies the vehicle performance requirements for any one of the insurance carrier plans. Example systems may include a telematics unit installed to a vehicle that is configured to collect vehicle movement data and contextual vehicle information.

16 Claims, 3 Drawing Sheets

VEHICLE EVENT DETECTION AND CLASSIFICATION USING CONTEXTUAL VEHICLE INFORMATION

TECHNICAL FIELD

The present invention relates to systems and methods for detecting vehicle events and determining risk levels associated with vehicle driver behavior.

INTRODUCTION

Vehicle movement data may be used to determine risk levels associated with driver behavior. This vehicle movement data may be used by vehicle owners, manufacturers, or insurance carriers to track the driving habits of any vehicle drivers/operators.

In some cases, insurance carriers may collect vehicle movement data by way of a vehicle data recording device placed in the vehicle by the vehicle owner. More specifically, the vehicle owner, believing they may qualify for an insurance discount based upon their driving habits, may be provided a recording device by the insurance carrier. The vehicle owner may have the device installed in the vehicle, which then collects accelerometer, global positioning satellite (GPS) data, or the like for a predetermined period of time. This data may be retrieved from memory within the device. Thereafter, the insurance carrier may determine whether the vehicle owner qualifies for discounts relating to prudent vehicle usage based upon the data collected. For example, the insurance carrier may offer a safe driving discount where the device indicates a limited number/proportion of hard braking/acceleration events, swerving, speeding, or the like.

Vehicle movement data in these applications generally comprises data collected by aftermarket "boxes" installed to the vehicle, such as accelerometer or GPS data. Accordingly, assumptions must be made with respect to the collected data. Merely as one example, it is an underlying assumption that a large percentage of all urgent movements of the vehicle such as hard braking or swerving are the fault of the driver. At a minimum, there is no way of discriminating between urgent movement that is prudent, e.g., where a driver swerves to avoid contact with another vehicle at fault, and urgent movement that is not prudent, e.g., where a driver has to swerve to avoid another vehicle due to the driver's inattention.

Additionally, aftermarket boxes are typically affiliated with a single insurance carrier, and may require an introductory period during which the vehicle owner pays insurance premiums before learning whether they qualify for a discount with that particular insurance carrier. As a result, to the extent insurance carriers set different performance requirements for their own discount programs, it is difficult for vehicle operators to compare discounts offered in the insurance marketplace by different carriers.

SUMMARY

In accordance with one aspect of the invention there is provided a method of detecting a vehicle event and classifying the vehicle event based on contextual vehicle information. The method includes the steps of: (a) collecting vehicle movement data at a vehicle using vehicle electronics installed in the vehicle; (b) detecting a vehicle event from the vehicle movement data; (c) obtaining contextual vehicle information at the vehicle that is separate from the vehicle movement data and that comprises information received from the vehicle electronics indicating a detected condition that is associated with the vehicle event; and (d) transmitting from the vehicle a message containing information indicative of the vehicle event and the detected condition.

In accordance with another aspect of the invention, there is provided a method of detecting and classifying one or more vehicle events based on contextual vehicle information. The method includes: (a) collecting vehicle movement data at a vehicle using vehicle electronics installed in the vehicle; (b) establishing a classification of at least one vehicle event in the vehicle movement data as exceeding a predetermined risk limit; (c) analyzing contextual vehicle information associated with the at least one vehicle event in response to the established classification; and (d) changing the established classification of the at least one vehicle event based upon the contextual vehicle information.

In accordance with yet another aspect of the invention, there is provided a method of determining and notifying a vehicle operator of satisfactory achievement of vehicle performance requirements. The method includes the steps of: (a) collecting vehicle movement data using vehicle electronics installed in a vehicle; (b) receiving vehicle performance requirements for a plurality of insurance carrier plans; (c) comparing the vehicle movement data with the vehicle performance requirements for each of the plurality of insurance carrier plans; and (d) notifying a vehicle operator when the vehicle data satisfies the vehicle performance requirements for any one of the insurance carrier plans.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
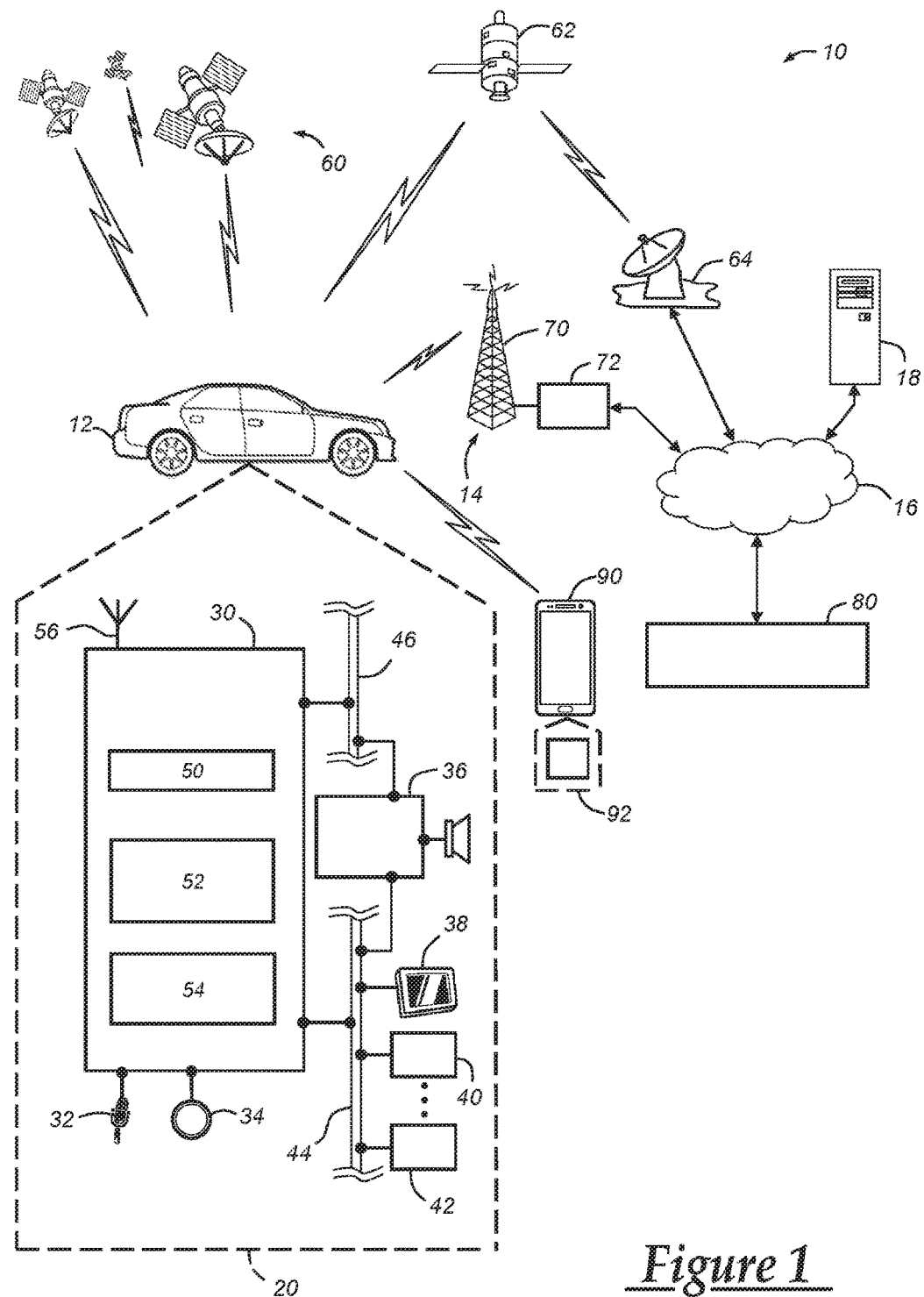
FIG. 1 is a block diagram depicting an embodiment of a communications system that is capable of utilizing the exemplary methods disclosed herein.

Exemplary embodiments are described herein of methods and systems for collecting vehicle movement data. One such embodiment involves a method of detecting a vehicle event and classifying the vehicle event based on contextual vehicle information, as well as a vehicle that includes vehicle electronics for carrying out the method. To do this, vehicle movement data is collected at a vehicle using the vehicle electronics installed in the vehicle. From this, a vehicle event is detected for which the contextual vehicle information is then obtained at the vehicle and analyzed. This contextual vehicle information is indicative of a detected condition that is associated with the vehicle event, and it may comprise information that is separate from the vehicle movement data received from the vehicle electronics. Thereafter, the vehicle may transmit a message containing the vehicle movement data and the contextual vehicle information, or containing other such information indicative of the vehicle event and the detected condition. In some embodiments, the method may also include a further step of classifying the vehicle event based at least in part on the vehicle movement data and the contextual vehicle information, with this classification step being carried out either by the vehicle, as done for the antecedent steps of the method, or at a remote location, such as by a server at a remote data facility.

In some exemplary approaches, vehicle movement data is collected at a telematics unit installed to a vehicle, in addition to contextual vehicle information that helps to inform conclusions made with respect to driver behavior. For example, when an event occurs that exceeds a given risk threshold, the contextual vehicle information (data) may be analyzed to determine whether the event should be reclassified. In some examples, this may result in reclassifying events that initially appear to indicate risky or unsafe driving as indications of prudent or safe driving.

Contextual data may take any form that is convenient. As will be described further below, in some exemplary approaches contextual data is provided by vehicle-installed equipment not typically available to aftermarket-installed or third-party devices. Vehicle-installed sensors, such as cameras, accelerometers, safety subsystems, or the like, may be used to provide contextual information associated with any events that initially appear to indicate unsafe, imprudent, or risky driving.

In at least some implementations, an example method may be directed to collecting vehicle movement data at a telematics unit installed to a vehicle, and receiving vehicle performance requirements for a plurality of insurance carrier plans. The method may further include comparing the vehicle movement data with the vehicle performance requirements for each of the plurality of insurance carrier plans, and notifying a vehicle operator when the vehicle data satisfies the vehicle performance requirements for any one of the insurance carrier plans.

In at least some implementations, a system may include a telematics unit installed to a vehicle, and at least one vehicle sensor in communication with the telematics unit. The telematics unit may be configured to collect vehicle movement data and contextual vehicle information associated with vehicle events included in the vehicle movement data, where the contextual vehicle information indicates vehicle externalities resulting in the at least one vehicle event.

Vehicle Data System

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and include a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art, or via other wireless communication methods, e.g., SMS/text messages. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 30 utilizes cellular communication according to GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO. CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX. ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 18, for other purposes, such as fleet management. Also, new or updated map data can be downloaded to the GPS module 40 from the remote facility 80 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the remote facility 80. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to remote facility 80. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 18 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 16. A database at the remote facility can store account information such as subscriber authentication information, vehicle identifiers, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle device, meaning that it is not a part of vehicle 12 or vehicle electronics 20. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application 92 that can allow a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. Wireless device 90 is shown as a smartphone having cellular telephone capabilities. In other embodiments, device 90 may be a tablet, laptop computer, or any other suitable device. In addition, application 92 may also allow the user to connect with the remote facility 80 or call center advisors at any time.

Vehicle 12 may be equipped with devices such as sensors or locating devices for collecting vehicle movement data. Merely as examples, accelerometers, location devices (e.g., GPS module 40), or the like may be used to collect vehicle movement data in order to make preliminary determinations with respect to a risk level associated with a vehicle event(s). These devices may comprise a vehicle systems module (VSM) or portion thereof, with the VSM being in communication with telematics unit 30 and other VSMs by way of the communication bus 44.

Vehicle 12 may also collect contextual vehicle information by way of other vehicle sensors or equipment, e.g., cameras or image-based sensors, or even other vehicle subsystems such as vehicle fog lights, cruise control, antilock braking system, drive system such as four-wheel or all-wheel drive systems, towing systems, windshield wipers, traction control, anti-rollover systems, seatbelts, vehicle audio system, collision sensing systems, lane departure sensing systems, or weather indicators may be used. Any of these systems comprise VMSs, such as VSM 42, and may provide contextual vehicle information to telematics unit 30, e.g., consistent with the information these systems typically collect in their ordinary usage, or as indicated by their status at the time of the event. For example, an anti-lock braking system may indicate slippage of one or more vehicles, which may help provide contextual information by indicating a low-friction environment at a particular wheel or side of the vehicle at the time of a detected vehicle event. Or, as another example, an object detection system that includes one or more sensors mounted on the vehicle to detect external conditions such as the presence (or absence) of objects near the vehicle as it is driving.

Method

Figure 2:
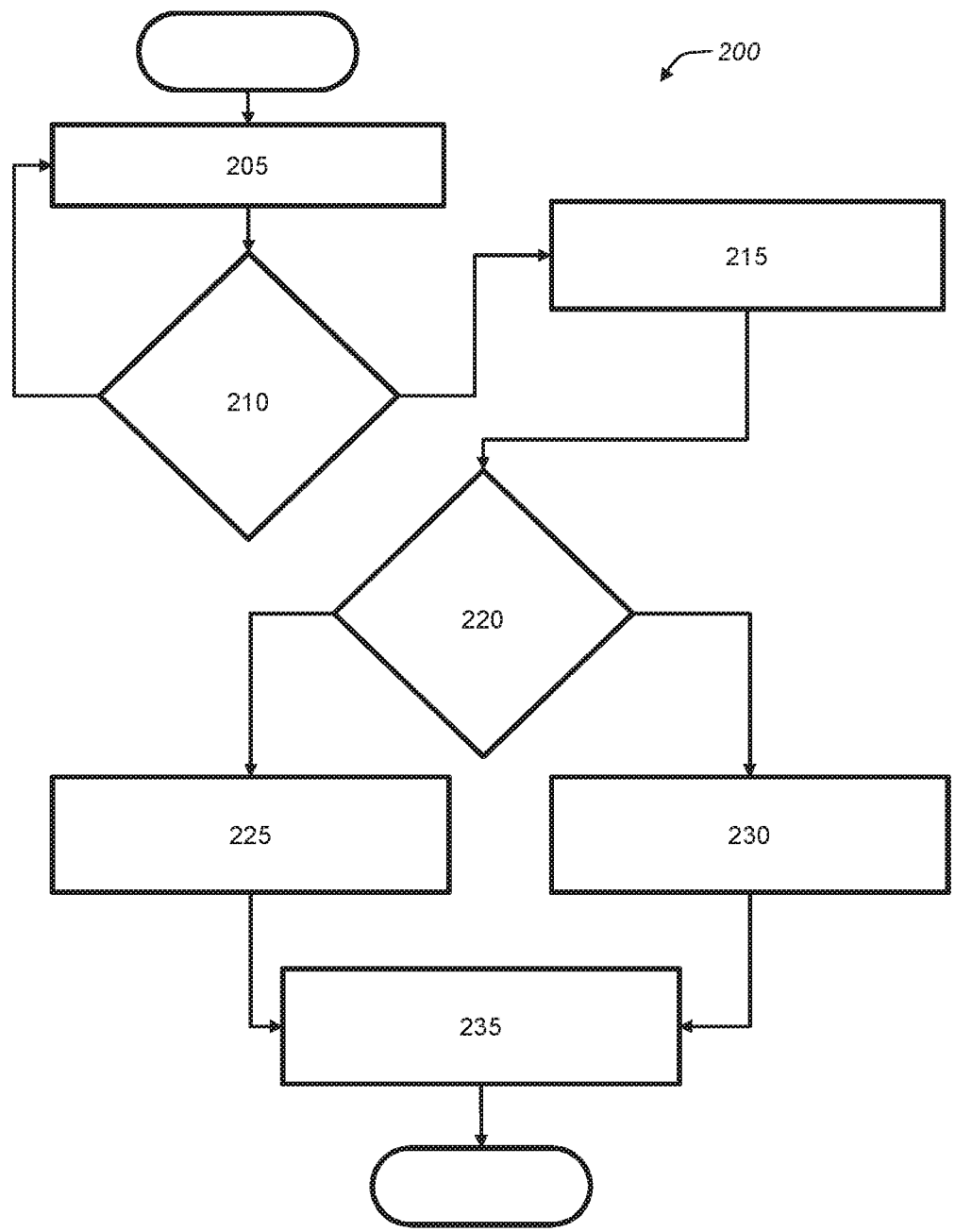
FIG. 2 is a process flow diagram illustrating example methods of collecting vehicle movement data.

Turning now to FIG. 2, a process flow diagram illustrating various exemplary methods of collecting vehicle information is shown. Process 200 may begin at block 205, where vehicle movement data is collected, e.g., at telematics unit 30 or some other vehicle system module (VSM) installed in vehicle 12 as a part of the vehicle electronics 20. As described above, telematics unit 30 may be in communication with a variety of vehicle sensors and/or subsystems that facilitate collection of vehicle information. Vehicle movement data may thereby be obtained through the telematics unit 30, although other equipment installed to the vehicle 12 may be used to do so. This vehicle movement data may be obtained by a speed sensor (such as used for providing a speedometer's indication of vehicle speed), a single or multi-axis accelerometer or group of accelerometers that indicate acceleration/deceleration along one or more axes, or a GPS receiver that provides instantaneous location information from which vehicle speed and/or acceleration may be determined. Once the vehicle movement data is obtained, the process 200 may then proceed to block 210.

At block 210, a check is made to determine whether the vehicle movement data is indicative of a vehicle event for which further processing is to be done. If not, the process may return to block 205 to obtain updated vehicle movement data. Once a vehicle event is detected, the process will move to step 215 to obtain contextual vehicle information that is used to help classify the vehicle event. The detection of a vehicle event at step 210 may be done in any of a number of ways, and in some embodiments, may involve an initial classification of the vehicle event as exceeding a predetermined risk limit. Merely as an example, as described above, a predetermined risk limit may provide a risk ceiling generally indicating an upper limit of safe or prudent driving by a vehicle operator. The predetermined risk limits may be associated with an insurance carrier plan, defined by a vehicle manufacturer and/or provided by a vehicle owner or operator. In some embodiments, the vehicle event may be detected and/or classified by determining that a measured vehicle acceleration is above a predetermined threshold value that is used as the predetermined risk limit. Other parameters may be used in addition to or in lieu of acceleration to detect the vehicle event and determine a risk level associated with use of vehicle 12.

Using vehicle acceleration as an example, vehicle acceleration that exceeds a predetermined threshold may indicate racing or otherwise risky acceleration by a vehicle operator. In another example, a significant vehicle deceleration may indicate hard or late braking. In another example, a vehicle event exceeding a predetermined risk limit may include a vehicle speed that is above a predetermined threshold, or above a predetermined threshold for a given percentage of driving time. For example, where a vehicle speed is above a local speed limit, or is significantly greater than a predetermined speed or speed limit, or is repeatedly for an extended period above a predetermined limit speed, this parameter may indicate risky or unsafe driving. In still other examples, the vehicle event may include a lateral acceleration that is above a predetermined threshold. Large lateral accelerations may indicate swerving, or otherwise dangerous vehicle maneuvers. This determination that a vehicle event occurred may be carried out by one of the vehicle system modules (VSMs) such as the telematics unit 30 by processing the vehicle movement data digitally using an electronic processor (e.g., processor 52) and determining that the vehicle event exceeds the predetermined risk limit that may be stored in memory (e.g., in memory 54).

Where such a vehicle event is detected, the process moves to block 215, and contextual vehicle information that is associated with the at least one vehicle event may be obtained at the vehicle and, in some embodiments, analyzed in response to the classification established at block 210. This contextual vehicle information is indicative of a detected condition, either internal to the vehicle or external (outside) the vehicle, and may be used to more accurately classify the vehicle event in terms of the appropriateness of the vehicle operator's handling of the vehicle. For example, where an event detected from the vehicle movement data indicates or provides a preliminary indication of risky or unsafe driving, the vehicle electronics (e.g., the vehicle telematics unit) may obtain contextual vehicle information that is separate from the vehicle movement data and that provides additional information which enables a more accurate assessment of the vehicle event and the reason(s) why it occurred. This contextual vehicle information may be indicative of a detected condition that is associated with the vehicle event, and may be obtained from vehicle subsystems, such as VSMs that include sensors, cameras, etc. For example, VSM 42 may be an object detection system, or may be a collision detection or collision avoidance system that includes an object detection system having one or more sensors for detecting external objects near the vehicle. The contextual vehicle information received from this system may then be indicative of a detected condition external to the vehicle; for example, indicative of the presence or absence of an object in the vehicle's path or otherwise near the vehicle.

In some examples, contextual vehicle information may be stored in the telematics unit 30 after being collected approximately at the same time or contemporaneously with the vehicle event that was classified as indicating risky or unsafe driving. Alternatively, the information may be stored at least temporarily elsewhere on the vehicle, such as in another VSM.

As noted above, contextual vehicle information may take any of a number of different forms. In one example, the contextual vehicle information includes an indication of an active status or use of a certain vehicle subsystem approximately at the time of the vehicle event that was classified as being risky or unsafe. Merely as examples, vehicle subsystems may include a vehicle fog light, a cruise control, an antilock braking system, a four-wheel drive system, a towing system, a driving mode, a windshield wiper, a traction control system, a seatbelt, a vehicle radio, a collision sensing system, a lane departure sensing system or a weather indicator. The activation of, non-use, or other status associated with these systems may help provide context with regard to vehicle events. More specifically, use or activation of such subsystems may help provide an indication that the vehicle event was not as risky or may even be an indication of prudent driving by a vehicle operator, e.g., as it was a response to a vehicle externality. For example, where the contextual information indicates that weather was particularly poor, e.g., snowy, icy, wet, or otherwise indicates difficult driving conditions, the contextual information may indicate that the behavior initially indicated as risky is less risky than initially classified at block 210.

As noted above, in other examples of contextual vehicle information, vehicle sensors or cameras may be used to detect an object near the vehicle or in the vehicle's path. For this, the contextual vehicle information may be obtained from an object detection system that is installed in the vehicle as a part of the vehicle electronics and that detects external objects near the vehicle, such as a moving vehicle or other object. In one example, the contextual vehicle information may indicate that an object moved suddenly into the vehicle's path, thereby explaining a large acceleration or deceleration or lateral acceleration subsequent to the detection of the object in the vehicle's path. In this manner, the contextual vehicle information may indicate that a vehicle operator took appropriate steps such as an evasive maneuver (e.g., swerving or hard braking) to avoid an object which moved suddenly and unexpectedly into the vehicle's path. The contextual information may thereby indicate that the detected vehicle event was a desirable and appropriate response to the detected external condition and that the vehicle operator has not engaged in behavior that is risky or unsafe. Accordingly, it may be determined from the contextual vehicle information that the vehicle event initially classified as risky or unsafe was an appropriate vehicle operator response to a vehicle externality or event.

The actual analysis of the contextual vehicle information, which can be done in conjunction with vehicle movement data, may be carried out at the vehicle or at a remote location. In either event, a message may be sent from the vehicle which contains information indicative of the vehicle event and the detected condition. Where remote analysis of the data is to be carried out, this message may contain the vehicle movement data and the contextual vehicle information itself, such as raw accelerometer data (e.g., as the vehicle movement data) and object detection system or traction control system data (e.g., as contextual vehicle information). Or, where some or all of the analysis is carried out on the vehicle, the message may contain the classification or results information rather than, or in addition to, the underlying data.

The transmission of the message from the vehicle may be done by the telematics unit 30 either contemporaneously with the detection of the vehicle event, or may be done at a later time as part of a vehicle data upload that may be scheduled or otherwise carried out at a later time. In some embodiments, other vehicle movement data concerning other vehicle events may be stored onboard the vehicle, and the message sent from the vehicle telematics unit may contain both the information indicative of the vehicle event and the detected condition, as well as information concerning the other vehicle events.

The analysis of the vehicle movement data and contextual vehicle information is indicated at step 220, where process 200 uses the contextual information received at block 215 to help classify the vehicle event initially detected at block 210. This query may be undertaken in any manner that is convenient. For example, contextual information may be reviewed automatically using one or more rules such as those explained above in the discussion of contextual information. Alternatively, contextual information may be reviewed manually by a remote facility or personnel at the remote facility.

If the query at block 220 concludes that the initially established classification of the vehicle event should be changed based upon the contextual vehicle information, then the vehicle event may be reclassified at block 225. Merely as an example, where the vehicle movement data is used to count a number of incidences or a rate of incidences of risky or unsafe driving, the vehicle event initially classified as one of these risky or unsafe incidences may be removed. Accordingly, events that are initially classified as being risky or indicating unsafe driving may be reclassified as indicating normal driving, and in some cases may indicate safe or prudent driving.

While contextual vehicle information may typically be most useful in determining when reducing the risk level as initially classified in block 210 is appropriate, in other examples a risk level of an event may be elevated after consideration of the contextual vehicle information. For example, where a driver induces a relatively large lateral acceleration of the vehicle to swerve around an object detected in the path of a vehicle, particularly risky or dangerous behavior may be indicated where the object was stationary or otherwise in the path of the vehicle for an extended period of time, thereby indicating substantial inattention by the vehicle operator.

Regardless of the type of change made to the initially classified level of risk at block 225, process 200 may subsequently proceed to block 235 afterward.

On the other hand, if the query at block 220 concludes that the established classification from block 210 should be maintained, then at block 230 the established classification is left undisturbed. For example, contextual information may confirm that events initially concluded to be risky or unsafe driving behavior are indeed indications of risky or unsafe driving behavior. For example, where an event involving a sudden lateral movement of the vehicle or late or hard braking of the vehicle is initially classified as a risky or unsafe driving event, contextual information collected by vehicle sensors, e.g., a camera, may be used to confirm this conclusion. More specifically, if vehicle cameras indicate that an object was in the vehicle's path for some amount of time preceding the event, then the contextual information provided by the vehicle camera may confirm that the subsequent sudden lateral movement or swerve of the vehicle made by the driver to avoid an object was due to inattention. Accordingly, the initially established classification of the event as being somewhat risky or unsafe may be maintained.

Proceeding to block 235, vehicle movement data may be compared with performance requirements to help determine an overall evaluation of a vehicle operator or owner. Merely as one example, vehicle movement data may be compared with a plurality of performance metrics to determine whether the vehicle movement data complies with any one of the performance requirements. For example, vehicle movement data may be compared with performance requirements for a plurality of insurance carrier discount plans for safe or otherwise exemplary driving. Vehicle performance requirements may be received by the vehicle telematics unit, received by the remote facility, or even provided by a vehicle owner or operator. In other examples, a vendor may receive requirements or performance parameters for the plurality of metrics. The vendor may also receive vehicle data. e.g., from remote facility 80, including contextual vehicle information as well as vehicle movement data.

Where the vehicle movement data meets vehicle performance requirements for any one of the plurality of metrics, e.g., insurance carrier plans, the telematics unit may indicate to a vehicle operator that the vehicle movement data satisfies performance requirement for any one of the metrics. Accordingly, a vehicle owner or operator may be notified when the vehicle movement data satisfies performance requirements for any one of a plurality of metrics. It is therefore not necessary for the vehicle owner or operator to do a manual search of metrics such as insurance carrier plans, sign up for multiple carriers to determine whether discounts may be achieved. Rather, the vehicle operator may be automatically notified of any result of the analysis done.

Figure 3:
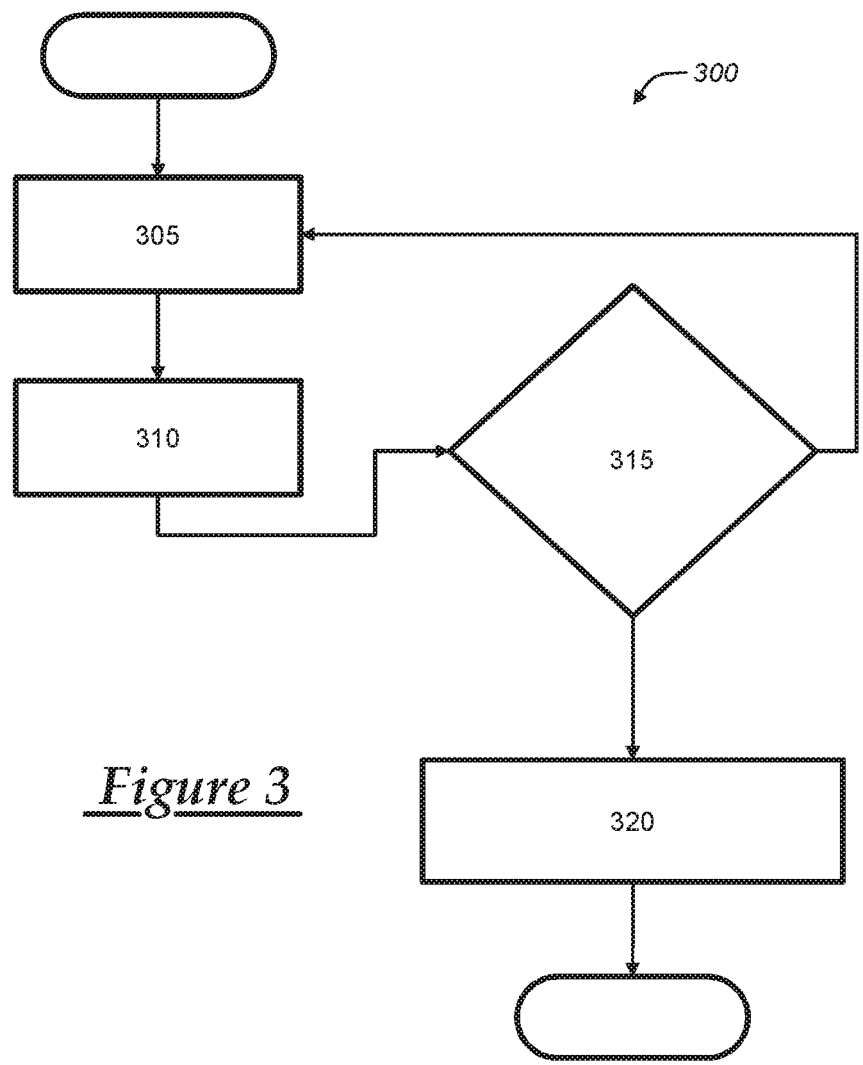
FIG. 3 is a process flow diagram illustrating other example methods of collecting vehicle movement data.

Turning now to FIG. 3, a process flow diagram illustrating other example methods of collecting vehicle information is shown. Process 300 may begin at block 305, where vehicle movement data is collected at a telematics unit installed to a vehicle. Process 300 may then proceed to block 310.

At block 310, performance requirements associated with a plurality of metrics may be received. Merely as one example, performance requirements for multiple insurance carrier plans may be received. The performance requirements for the different metrics may be received at the telematics unit, at the remote facility, or anywhere else that is convenient. As noted above, for example, a third party or vendor may receive requirements or performance parameters for the plurality of metrics, as well as vehicle movement data and/or contextual vehicle information. Accordingly, a vendor may perform comparisons of the vehicle movement data and contextual vehicle information to determine whether any one of the metrics have been met by the vehicle movement data and/or contextual vehicle information.

Proceeding to block 315, vehicle movement data collected at block 305 is compared with the performance requirements at block 310. Accordingly, vehicle movement data may be compared with performance requirements, e.g., for a plurality of metrics such as insurance carrier plans. Block 315 may thereby query whether vehicle movement data satisfies the vehicle performance requirements for any one of the metrics. The comparison at block 315 may, in addition to vehicle movement data, rely upon contextual information in addition to vehicle movement data is collected by the telematics unit. Accordingly, contextual information may be used in conjunction with vehicle movement data, e.g., as described above with regard to FIG. 2 and process 200. More specifically, contextual information may be analyzed to determine whether event(s) included in the vehicle movement data initially indicating unsafe or risky driving behavior should be reclassified. In some examples described above, this may result in reclassifying vehicle events included in the movement data as being risky or unsafe as being examples of prudent, safe, or at least less risky driving behavior. Process 300 may then proceed to block 320.

At block 320, a vehicle operator may be notified when the vehicle's data satisfies the vehicle performance requirements for any one of the metrics from query 315. For example, a telematics unit in the vehicle may display a notification within the vehicle 12, or may provide a notification via a mobile device 90, or otherwise provide some indication that the driver has met performance requirements associated with any one of the metrics. In one example, the driver may thereby be notified when any one of a plurality of insurance carrier plans offer discounts associated with a driving behavior of the vehicle operator or owner. Process 300 may then terminate.

As will be appreciated by those skilled in the art, the methods of FIGS. 2 and 3 may be carried out together to provide a system and method that both monitors and classifies driver behavior for insurance purposes and provides notification/feedback to the operator concerning their progress in meeting insurance carrier performance requirements.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of detecting a vehicle event and classifying the vehicle event based on contextual vehicle information, comprising the steps of:
   (a) collecting vehicle movement data at a vehicle using vehicle electronics installed in the vehicle;
   (b) detecting a vehicle event from the vehicle movement data;
   (c) obtaining contextual vehicle information at the vehicle that is separate from the vehicle movement data and that comprises information received from the vehicle electronics indicating a detected condition that is associated with the vehicle event; and
   (d) transmitting from the vehicle a message containing information indicative of the vehicle event and the detected condition;
   wherein: step (a) is carried out using any one or more of a speed sensor, accelerometer, or GPS receiver; step (b) comprises processing the vehicle movement data digitally using an electronic processor and determining that the vehicle event exceeds a predetermined risk limit; and step (c) is carried out in response to the determination in step (b); and
   wherein step (c) further comprises obtaining at least some of the contextual vehicle information from an onboard system that is installed in the vehicle as a part of the vehicle electronics and that detects either an internal condition indicative of a vehicle subsystem status or of operation of the vehicle by an operator, or an external condition indicative of an object near the vehicle, and for which the contextual vehicle information comprises information which indicates that the vehicle event is an evasive maneuver carried out by the vehicle operator in response to the detected presence of the nearby object.

2. The method of claim 1, further comprising the step of (e) classifying the vehicle event based at least in part on the vehicle movement data and the contextual vehicle information, wherein at least steps (a) through (d) are carried out at the vehicle.

3. The method of claim 1, wherein vehicle electronics includes a vehicle telematics unit, wherein the method further comprises storing other vehicle movement data concerning other vehicle events, and wherein step (d) further comprises sending a message from the vehicle telematics unit that contains the information indicative of the vehicle event and the detected condition, and that contains information concerning the other vehicle events.

4. The method of claim 1, wherein the contextual vehicle information comprises information received from the vehicle electronics indicative of the external condition that is associated with the vehicle event.

5. A method of detecting and classifying one or more vehicle events based on contextual vehicle information, comprising the steps of:
   (a) collecting vehicle movement data at a vehicle using vehicle electronics installed in the vehicle;
   (b) establishing a classification of at least one vehicle event in the vehicle movement data based on the at least one vehicle event exceeding a predetermined risk limit;
   (c) analyzing contextual vehicle information associated with the at least one vehicle event in response to the established classification;
   (d) changing the established classification of the at least one vehicle event based upon the analysis of the contextual vehicle information; and
   (e) comparing the vehicle movement data with vehicle performance requirements for a plurality of insurance carrier plans; and notifying a vehicle operator when the vehicle data satisfies the vehicle performance requirements for any one of the insurance carrier plans.

6. The method of claim 5, wherein the predetermined risk limit is determined based on information from an insurance carrier plan.

7. The method of claim 5, wherein changing the established classification includes determining that the at least one vehicle event is below the predetermined risk limit.

8. The method of claim 5, wherein the contextual vehicle information includes an indication of an active status of a vehicle subsystem at the time of the at least one vehicle event.

9. The method of claim 8, wherein the vehicle subsystem is a vehicle safety subsystem.

10. The method of claim 8, wherein the vehicle subsystem includes at least one of a vehicle fog light, a cruise control, an anti-lock braking system, a four-wheel-drive system, a towing system, a driving mode, a windshield wiper, a traction control system, a seatbelt, a vehicle radio, a collision sensing system, a lane departure sensing system, or a weather indicator.

11. The method of claim 5, further comprising determining, from at least the contextual vehicle information, that the at least one vehicle event is a vehicle operator response to a vehicle externality.

12. The method of claim 11, wherein the vehicle externality is an object in the path of the vehicle.

13. The method of claim 5, wherein the at least one vehicle event includes at least one of a vehicle acceleration above a predetermined threshold or a vehicle deceleration above a predetermined threshold.

14. The method of claim 5, wherein the at least one vehicle event includes a vehicle lateral acceleration above a predetermined threshold.

15. A method of determining and notifying a vehicle operator of satisfactory achievement of vehicle performance requirements, comprising the steps of:
   (e) collecting vehicle movement data using vehicle electronics installed in a vehicle;
   (f) receiving vehicle performance requirements for a plurality of insurance carrier plans;
   (g) comparing the vehicle movement data with the vehicle performance requirements for each of the plurality of insurance carrier plans;
   (h) notifying a vehicle operator when the vehicle data satisfies the vehicle performance requirements for any one of the insurance carrier plans;
   (e) collectin vehicle movement data at the vehicle using the vehicle electronics;
   (f) detecting a vehicle event from the vehicle movement data;
   (g) obtaining and controlling contextual vehicle information at the vehicle that is separate from the vehicle movement data and that comprises information received from the vehicle electronics indicating a detected condition that is associated with the vehicle event; and
   (h) transmitting from the vehicle a message containing information indicative of the vehicle event and the detected condition.

16. The method of claim 15, further comprising the steps of:
   (e) establishing a classification of at least one vehicle event in the vehicle movement data as exceeding a predetermined risk limit;
   (f) analyzing contextual vehicle information associated with the at least one vehicle event in response to the established classification; and
   (g) changing the established classification of the at least one vehicle event based upon the contextual vehicle information.

* * * * *